United States Patent [19]

Gahn et al.

[11] 4,382,116
[45] May 3, 1983

[54] ZIRCONIUM CARBIDE AS AN ELECTROCATALYST FOR THE CHROMOUS/CHROMIC REDOX COUPLE

[75] Inventors: Randall F. Gahn, Columbia Station; Margaret A. Reid, Bay Village, both of Ohio; Chiang Y. Yang, Ridge, N.Y.

[73] Assignee: The United States of America as represented by the Administrator of the National Aeronautics and Space Administration, Washington, D.C.

[21] Appl. No.: 266,255

[22] Filed: May 22, 1981

[51] Int. Cl.³ ............................................. H01M 8/20
[52] U.S. Cl. ........................................ 429/34; 429/40; 429/105; 429/107; 429/109
[58] Field of Search ...................... 429/34, 40, 41, 44, 429/46, 101, 105, 27, 199, 107, 109; 252/410, 443

[56] References Cited

U.S. PATENT DOCUMENTS

| | | | |
|---|---|---|---|
| 2,946,836 | 7/1960 | Justi et al. | 429/40 X |
| 3,756,860 | 9/1973 | Binder et al. | 429/44 X |
| 3,977,901 | 8/1976 | Buzzelli | 429/44 X |
| 3,996,064 | 12/1976 | Thaller | 429/21 X |
| 4,062,807 | 12/1977 | Suzuki | 252/477 R |
| 4,159,366 | 6/1979 | Thaller | 429/101 X |
| 4,192,910 | 3/1980 | Frosch et al. | 429/101 |

Primary Examiner—Anthony Skapars
Attorney, Agent, or Firm—Norman T. Musial; John R. Manning; James A. Mackin

[57] ABSTRACT

Zirconium carbide is used as a catalyst in a REDOX cell for the oxidation of chromous ions to chromic ions and for the reduction of chromic ions to chromous ions. The zirconium carbide is coated on an inert electronically conductive electrode which is present in the anode fluid of the cell.

4 Claims, 4 Drawing Figures

NOTE:
WITH THE CELL BEING DISCHARGED, THE ELECTRODE AT WHICH OXIDATION TAKES PLACE IS THE ANODE.

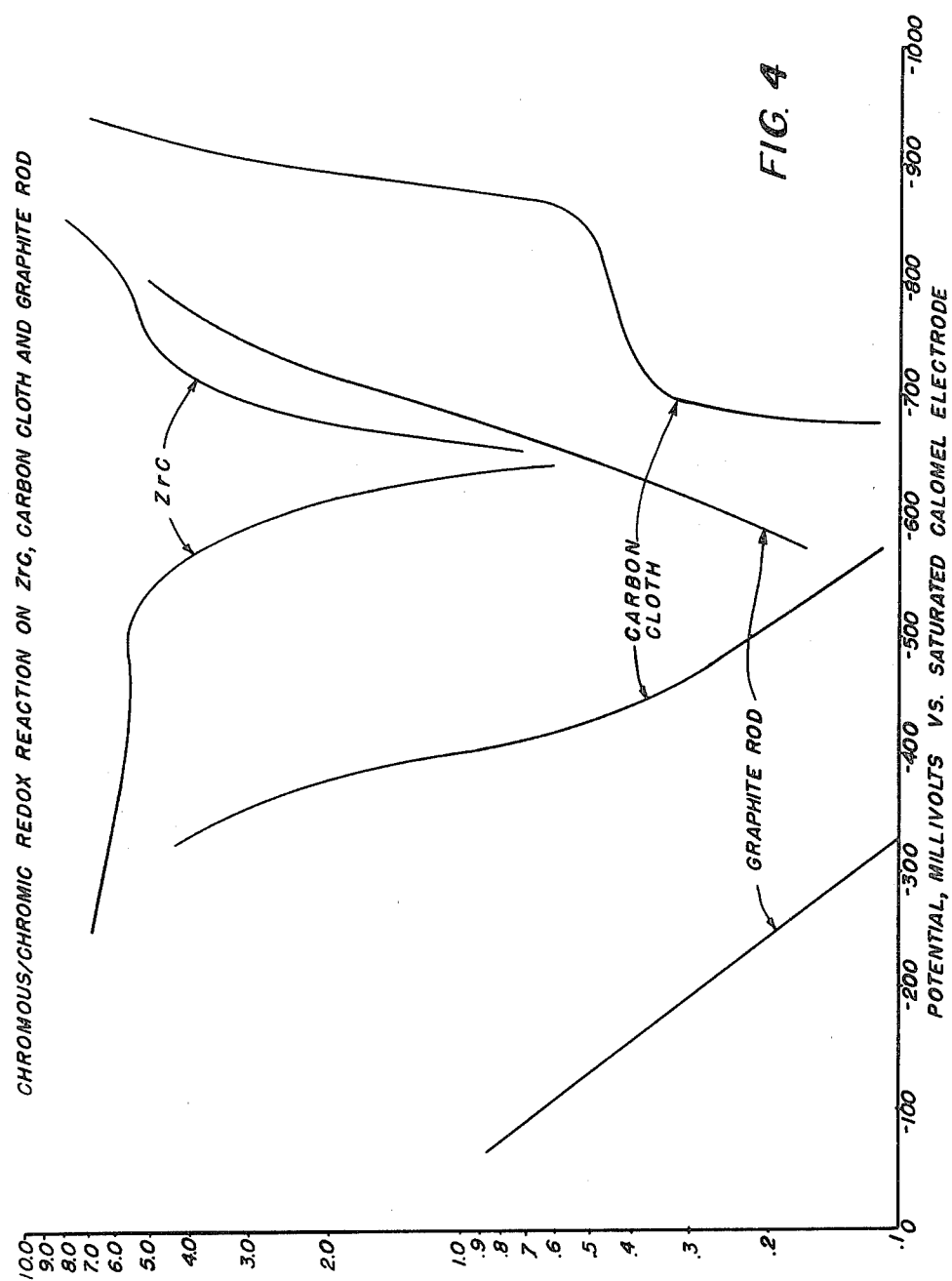

ZIRCONIUM CARBIDE AS AN ELECTROCATALYST FOR THE CHROMOUS/CHROMIC REDOX COUPLE

ORIGIN OF THE INVENTION

This invention was made by employees of the U.S. Government and may be manufactured or used by or for the Government without the payment of any royalties thereon or therefor.

BACKGROUND AND SUMMARY OF THE INVENTION

Because of the energy crisis beginning in the mid-1970's and due to economic factors within the electric utility industry, there is a need for storing bulk quantities of electrical power which might be produced intermittently or randomly by devices such as wind-driven generators, solar cells or the like. A number of methods have been considered including the storage of compressed air in large reservoirs, flywheels, capacitive storage, inductive storage and a number of electric chemical schemes. Electrochemical storage batteries are generally expensive, heavy and subject to deterioration when subjected to repeated charge and discharge actions.

Up until now, only pumped water storage wherein water from a water storage pond at one level is directed to a water storage pond at a lower level through a hydro-electric plant having a water pumping capability has proven to be a viable method. Unfortunately, such facilitites are limited to areas where the terrain is suitable for providing water sources at different elevations.

Electrically rechargeable REDOX flow cell systems are well known and have a very high overall energy efficiency as compared to many other systems. Furthermore, REDOX type cells can be discharged more completely than secondary battery systems. Additionally, REDOX cells are inexpensive as compared to secondary batteries and do not deteriorate as significantly when repeatedly discharged or recharged.

Accordingly, it is an object of the present invention to provide a REDOX cell which acts as a bulk energy storage system of very high overall efficiency.

Another object of the present system is to increase the rates of charging and discharging of REDOX flow cells that use the soluble chromous/chromic REDOX couple.

A further object of the present invention is to provide electrode structures of a REDOX cell which are catalytic for the oxidation of chromous ions to chromic ions, catalytic for the reduction of chromic ions to chromous ions and highly irreversible for the hydrogen evolution reaction.

Still another object of the present invention is to provide a REDOX cell wherein the active materials are not present in the cell at all times.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In accordance with the present invention, zirconium carbide is used as a catalyst for the oxidation of chromous ions to chromic ions in a REDOX cell. It is also used as a catalyst for the reduction of chromic ions to chromous ions in a REDOX cell. The zirconium carbide is coated on an inert, electrically conductive electrode.

The general purpose of the present invention is to increase the rates of charging and discharging of REDOX flow cells that use the soluble chromous/chromic REDOX couple. The reversible half-cell potential for this REDOX couple is about −0.4 volts with respect to the hydrogen evolution potential. Upon recharge of a REDOX flow cell where chromium ions are being transformed from the plus three valence state to the plus two valence state, the thermodynamically favored electrochemical reaction would be the evolution of hydrogen. However, the kinetics of the hydrogen evolution reaction are slow on many surfaces. The desired electrode surface for the chromous/chromic reaction is one that would have a high hydrogen overvoltage (slow kinetics for hydrogen evolution) and yet at the same time be highly reversible for the electrochemical oxidation and reduction of chromium ions.

Previously, carbon and graphite materials were used as electrode structures. These materials permitted the desired results to be obtained; that is, chromic ions could be recharged to chromous ions with only a minimum fraction of the charging current being consumed by the undesired reaction of hydrogen evolution. However, the rate at which the reduction of chromic ion ($Cr^{+3} + e^- \rightarrow Cr^{+2}$) took place while still maintaining a high charging efficiency (>95%) was very low. A charging rate of about 3 ma/cm$^2$ was typical for cells that used graphite cloth as the chromium electrode when an overvoltage of 100 milli-volts was applied to the cell. Further, the rate at which current could be withdrawn from a fully charged chromous chloride solution indicated that carbon and graphite surfaces were not catalytic for the oxidation to chromic chloride solution.

The material zirconium carbide was found to be catalytic for the oxidation of chromous ions to chromic ions, catalytic for the reduction of chromic ions to chromous ions as well as being highly irreversible for the hydrogen evolution action.

DESCRIPTION OF THE PRIOR ART

As indicated by U.S. Pat. Nos. 3,996,064 and 4,192,910, REDOX electrical cells are well-known. One of the best known REDOX cells uses an anode fluid having a chromic/chromous couple and a cathode fluid having ferrous/ferric couple. In the prior art, electric potential from such a REDOX cell was obtained by terminals connected to respective inert electrodes, one being disposed in the cathode fluid. Carbon and graphite products which are inert to the anode and cathode fluids were used as electrodes in some cases.

U.S. Pat. No. 4,062,807 to Suzuki describes catalysts for reducing the nitrogen oxides contained in internal combustion exhaust gases $N_2$ and $O_2$. The substrate for the catalyst can be Ni, Co, Fe or an alloy. Catalysts affixed to the substrate are carbides of Cr, Ti, Zr or V. ZrC is used in this patent as a catalyst for the gas phase reaction of reducing nitrogen oxides.

U.S. Pat. No. 3,756,860 to Binder et al discloses a tungsten carbide catalyst which is used for the anodic hydrogen oxidation in an acid fuel cell. Trace amounts of other carbides, such as ZrC, were added to the WC to optimize the catalytic activity.

U.S. Pat. No. 3,992,278 to Malkin et al describes a cathode used for the electrolysis of aqueous alkali metal hydroxide or halide solutions. Coatings of cobalt and zirconium dioxide are melt sprayed onto various conductive metal substrates.

U.S. Pat. No. 3,996,064 to Thaller discloses a bulk energy storage system including an electrically rechargeable reduction-oxidation cell divided into two compartments by a membrane, each compartment containing an electrode. An anode fluid is directed through the first compartment at the same time that a cathode fluid is directed through the second compartment, thereby causing the electrode in the first compartment to have a negative potential while the electrode in the second compartment has a positive potential.

U.S. Pat. No. 4,192,910 to Frosch et al discloses an electricity producing cell of the reduction-oxidation (REDOX) type. The electrode which is utilized in the cell is an electrically conductive, inert material plated with copper, silver or gold. A thin layer of lead is plated onto the copper, silver or gold layer when the cell is being charged, the lead ions being available from lead chloride which was added to the anode fluid. If the REDOX cell is then discharged, the current flows between the electrodes causing the lead to deplate from the negative electrode and the metal coating on the electrode will act as a catalyst to cause increased current density.

No prior art is known which utilizes zirconium carbide as a catalyst for a REDOX flow cell which utilizes the soluble chromous/chromic REDOX couple.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a graph comparing the chromous/chromic REDOX reaction as carried out on the electrode of the invention with respect to the electrodes of the prior art.

DETAILED DESCRIPTION OF THE INVENTION

Figure 1:
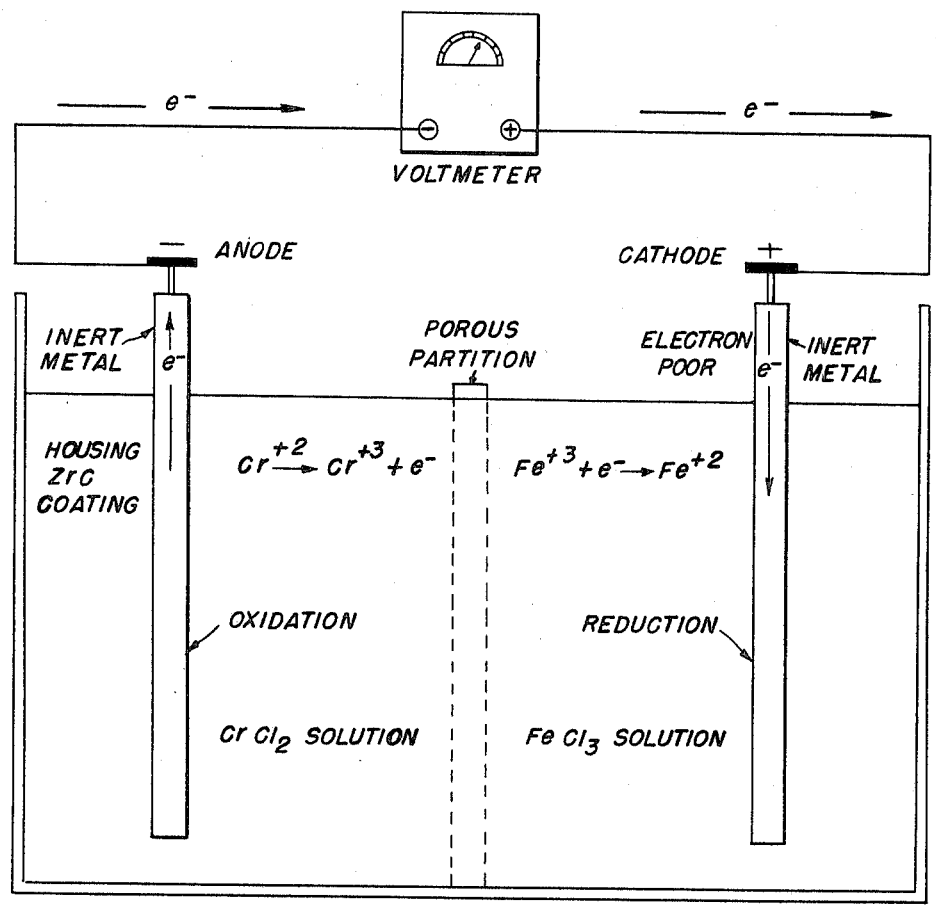
FIG. 1 is a highly schematic drawing showing the chemical reactions involved in the discharging cycle of the REDOX cell of the present invention.

Referring now to FIG. 1, there is shown a REDOX cell in which an inert electrically conductive electrode is placed in a solution of FeCl$_3$, and an inert electrically conductive electrode having a coating of zirconium carbide placed in a solution of CrCl$_2$. The two solutions are separated by a porous partition which permits ions to pass but prevents gross mixing of the solutions. The two electrode reactions are such that the inert electrically conductive electrode having a zirconium carbide coating acquires a negative charge with respect to the other inert electrically conductive electrode which becomes positively charged. Such an arrangement is capable of generating a small electric current in an external circuit which is connected between the electrodes.

The reaction at the surface of the zirconium carbide coated anode is an oxidation reaction as shown by the following equation:

$$Cr^{+2} \rightarrow Cr^{+3} + e^-$$

The reaction at the surface of the cathode is a reduction reaction as shown by the following equation:

$$Fe^{3+} + e^- \rightarrow Fe^{2+}$$

As $Cr^{+3}$ ions are formed, electrons accumulate on the zirconium carbide coated electrode imparting to it a negative charge. Electrons thus migrate through the external circuit toward the cathode. Here they restore the deficiency of electrons by $Fe^{+3}$ ions undergoing reduction to $Fe^{+2}$ ions. Thus, in effect, electrons are transferred from $Cr^{+2}$ ions through the external circuit to $Fe^{3+}$ ions. The overall reaction can be written as follows:

$$Cr^{+2} + Fe^{3+} \rightarrow Cr^{+3} + Fe^{2+}$$

Figure 2:
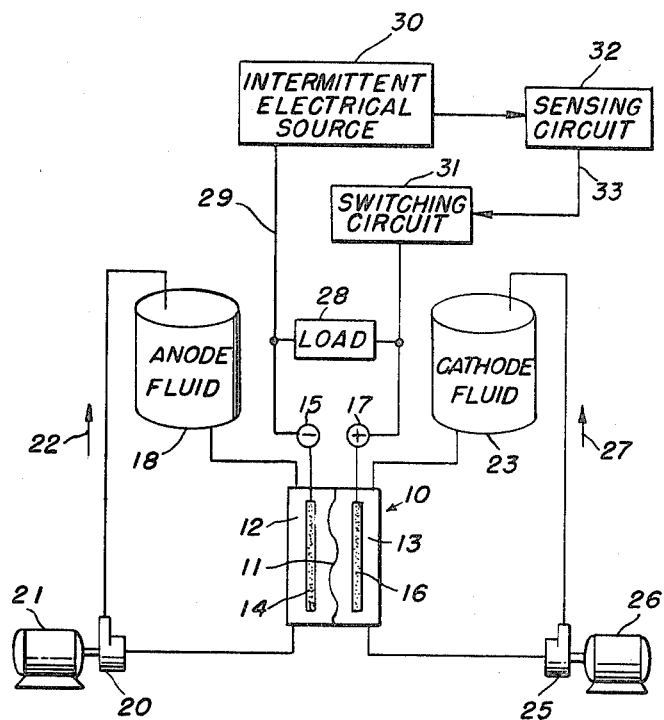
FIG. 2 is a schematic drawing of an electrical system embodying the invention.

Referring now to FIG. 2, there is shown an electrical system including an electric potential or voltage-producing cell 10 divided by an ion selective membrane 11 into a first compartment 12 and second compartment 13. An electrode 14 is disposed in the first compartment 12 and produces a negative potential at a terminal 15. In a like manner, an electrode 16 is disposed in the second compartment 13 and produces a positive voltage at terminal 17.

The difference of electric potential or voltage between the terminals 15 and 17 results from flowing an anode fluid containing a REDOX couple primarily in its reduced state through compartment 12. Similarly, a cathode fluid containing a REDOX couple primarily in its oxidized state flows through compartment 13.

The anode fluid for compartment 12 flows from an anode fluid supply tank 18 through compartment 12. A pump 20 driven by an electric motor 21 pumps the anode fluid back to the anode fluid supply tanks. Similarly, the cathode fluid flows from a cathode fluid supply tank 23 through the compartment 13. A pump 25 driven by an electric motor 26 pumps the cathode fluid back to supply tank 27 as indicated by arrow 27. The motors 21 and 26 run continuously, powered from any desired source.

The purpose of the electrical system shown in FIG. 2 is to supply electrical power as needed to a load 28. This load is connected between the terminals 15 and 17 of cell 10. One side of load 28 is connected through a lead 29 to an intermittent or non-continuous electrical source 30 such as, for example, a wind-driven generator. The other side of load 28 is connected through a switching circuit to the electrical source 30.

To the end that the intermittent electrical source 30 may be disconnected from load 28, and consequently from the terminals 15 and 17, when there is little or no electrical power being generated by source 30, there is provided a sensing circuit 32 having an input connected to source 30 and an output connected via a lead 33 to the input of switching circuit 31. When the output voltage of source 30 drops below a predetermined value, sensing circuit 32 causes switching circuit 31 to open, thereby disconnecting load 28 and terminals 15 and 17 from source 30.

While FIG. 2 shows the fluid supply tanks 18 and 23 positioned higher than cell 10, other arrangements are possible. However, there is some advantage to locating the supply tanks above cell 10. With such an arrangement, fluid will flow by gravity through cell 10 even though pumps 21 and 26 are unoperative. However, FIG. 2 does not rely on gravity since the pumps continuously circulate the anode and cathode fluids.

Figure 3:
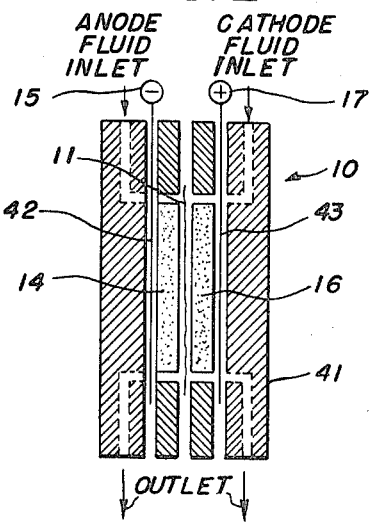
FIG. 3 is a schematic drawing showing more details of the electric cell of FIG. 2.

Referring now to FIG. 3, the voltage cell 10 is shown in greater detail than in FIG. 2. Elements corresponding to those of cell 10 in FIG. 2 are identified by like numerals. As shown, cell 10 comprises a container 41 which may be made of plastic, hard rubber or the like divided into first and second compartments by an ion selective membrane 11. Electrodes 14 and 16 disposed in the first and second compartments may be graphite felt pads which are inert to the anode and cathode fluids. Depending upon whether the chromous/chromic couple is employed in only the first or second compartments or both, electrodes 14 and 16 will also have the zirconium carbide catalyst of the invention affixed to the surfaces of one or both of the electrodes. The electrodes which have the zirconium carbide affixed to the surfaces thereof promote the REDOX reaction of the chromous/chromic couple. Voltage and current are provided for terminals 15 and 17 by graphite current collectors 42 and 43 which contact the electrodes 14 and 16, respectively.

If the system shown in FIG. 2 were to cycle between 5 and 95 percent depth of discharge, the open circuit voltage would theoretically vary between 1.334 and 1.032, assuming that the couples employed are $Cr^{+2}/Cr^{+3}$ and $Fe^{+3}/Fe^{+2}$. With the arrangement of FIG. 2 and continuously flowing fluids, the cell voltage under load would gradually decrease from the upper to the lower limit (neglecting IR and polarization losses).

Factors which must be considered regarding the membrane 11, the anode and cathode fluids which contain reduced and oxidized species dissolved in a solvent (water is preferred), and finally the electrodes 14 and 16 will now be discussed.

A. MEMBRANE CONSIDERATIONS

The requirements and options in regard to the membrane that is used to separate the anode and cathode fluids can be illustrated by considering a simple REDOX cell system with the reactions written in the discharge direction.

Anode compartment; $A^{+1} \rightarrow A^{+2} + e^-$
Cathode compartment; $C^{+2} + e^- \rightarrow C^{+1}$ The membrane must provide an impermeable barrier to both the A and C ions in both states of charge. Further, it must provide the means by which charge neutralization is maintained. During discharge either positive ions ($H^+$, for example) must move from the anode compartment or negative ions ($Cl^-$, for example) must move from the cathode compartment to the anode compartment. There is an inherent disadvantage from an energy standpoint in moving positive ions from the anode compartments during discharge as opposed to the other option. The iron/chromium system will be used to illustrate this. An ideal hydrogen ion transport membrane and an ideal chloride ion transport membrane will be used in the illustration.

| Before discharge | After discharge |
|---|---|
| CASE 1—$H^+$ membrane | |
| $Cr^{+2}$—1.0 N   $Fe^{+3}$—1.0 N | $Cr^{+3}$—1.0 N   $Fe^{+2}$—1.0 N |
| $H^+$—1.0 N   $Cl^-$—3.0 N | $Cl^-$—3.0 N   $H^+$—1.0 N |
| $Cl^-$—3.0 N | $Cl^-$—3.0 N |
| CASE 2—$Cl^-$ membrane | |
| $Cr^{+ -}$—1.0 N   $Fe^{+3}$—1.0 N | $Cr^{+3}$—1.0 N   $Fe^{+2}$—1.0 N |
| $Cl^-$—2.0 N   $Cl^-$—1.0 N | $Cl^-$—3.0 N   $Cl^-$—3.0 N |

In Case 1 as compared to Case 2, 1 mole of HCl is required per Faraday over and above any acid that may be required for pH adjustment needed for solution stabilization. In addition, an anion membrane would most likely have a better selectivity for preventing cross diffusion of the REDOX ions. Cross diffusion of such ions would represent a permanent loss of system capacity.

B. ANODE AND CATHODE FLUID CONSIDERATIONS

REDOX couples which preclude the electrolysis of water during discharge of the cell must be used. The anode and cathode fluids are respective solutions between 1 and 4 molar.

The anode fluid preferably contains water as a solvent having dissolved therein a chloride salt selected from the group consisting of titanium chloride, chromium chloride, iron chloride, tin chloride, vanadium chloride, manganese chloride and cerium chloride whereby cations in a reduced state are produced. The cathode fluid preferably contains water as a solvent having dissolved therein a chloride salt selected from the group consisting of iron chloride, chromium chloride, vanadium chloride, manganese chloride, and cerium chloride whereby cations in a reduced state are produced. The cathode fluid preferably contains water as a solvent having dissolved therein a chloride salt selected from the group consisting of iron chloride, chromium chloride, vanadium chloride, manganese chloride, and cerium chloride whereby cations in an oxidized state are produced.

It should be realized that while both the anode and cathode fluids, as discussed above, may be water containing chromium chloride, at least the anode fluid must be water containing chromium chloride.

C. ELECTRODE CONSIDERATIONS

The electrodes 14 and 16 have as their basic structure thereof graphite foils, cloths or felts, or metal screens, all of these being of the type customarily used in fuel cells. In general, the basic structure of the electrodes are inert to electrochemical or chemical reaction with the anode or cathode fluids. They are also porous electronic conductors. Finally, when an electrode is to be placed in a cell containing a chromous/chromic REDOX couple, its surfaces have affixed thereto the zirconium carbide catalyst of the present invention.

The electrodes may be prepared by any of the procedures customarily employed in the prior art. Frequently, the electrode substrate will be a porous electronic conductor, e.g., a metal screen, an expanded metal mesh, perforated metal and the like. After cleaning of the substrate, e.g., by chemical etching or sand blasting a zirconium carbide coating is applied thereto by immersion in a suspension containing zirconium carbide particles, followed by drying below 350° C. Alternatively the zirconium carbide coating could be applied by flame or plasma spraying, or by coating with mixtures of ZrC powder and a binder such as polytetrafluoroethylene. The ZrC can be vapor deposited on a substrate such as porous or solid carbon. Further details of the preparation of the electrodes, as discussed above, may be found in U.S. Pat. No. 4,062,807 to Suzuki and U.S. Pat. No. 3,992,278 to Malken et al.

As previously stated, the material zirconium carbide was found to be catalytic for the oxidation of chromous ions to chromic ions, catalytic for the reduction of chromic ions or chromous ions as well as being highly irreversible for the hydrogen evolution reaction. The more nearly reversible behavior or zirconium carbide compared with a graphite carbon cloth is shown in FIG. 4. In this case the open circuit potential of the chromous/chromic on both carbon and ZrC was about $-0.65$ V vs. saturated calomel (SCE) which is thermodynamically appropriate for this couple. However, this value was drifting toward less negative values on the carbon, and in fact much data on carbon exhibits open circuit values less negative than $-0.51$ V v. SCE. Such a value is suggestive of a mixed potential involving the chromium and hydrogen electrode reactions. An example of such a case is shown by the dashed curves of FIG. 4 representing the reaction on solid graphite. There is a greater activity with respect to the hydrogen electrode reaction which has two disadvantages. First, the polarization is greater, leading to decreased voltage efficiency. Second, the evolution of hydrogen in the cathodic (charging) mode is greater, leading to decreased current efficiency. In FIG. 4 even the most efficient reaction on carbon displays current densities for a given polarization that are less than those for ZrC by a factor of ten or more.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A REDOX cell having first and second chambers separated by an ion permeable membrane;
   an anode electrode and the cathode electrode disposed in said first and second chambers, respectively,
   means for flowing an anode fluid through the first chamber and
   means for flowing a cathode fluid through the second chamber, wherein
   the anode fluid contains water as a solvent having dissolved therein chromium chloride whereby cations in a reduced state are produced and the cathode fluid contains water as a solvent having dissolved therein a chloride salt selected from the group consisting of iron chloride, chromium chloride, vanadium chloride, manganese chloride and cerium chloride whereby cations in an oxidized state are produced, the anode and cathode electrodes being electrically conductive but inert with respect to the anode and cathode fluids, respectively, and
   at least one of said electrodes contains zirconium carbide as a catalyst for the electrochemical reaction of the cell.

2. The REDOX cell of claim 1 wherein the zirconium carbide is coated on at least said anode.

3. An electrochemical cell which increases the rates of charging and discharging REDOX flow cells that use the soluble chromous/chromic REDOX couple which comprises first and second chambers separated by an ion permeable membrane;
   an anode electrode and a cathode electrode disposed in said first and second chambers, respectively,
   means for flowing an anode fluid through the first chamber and
   means for flowing a cathode fluid through the second chamber, wherein
   at least said anode contains zirconium carbide as a catalyst for the electrochemical reaction of the cell, said zirconium carbide being catalytic for the oxidation of chromous ions to chromic ions and catalytic for the reduction of chromic ions to chromous ions.

4. The electrochemical cell of claim 3 wherein the cathode fluid is ferric chloride, and the anode fluid is chromium chloride and the anode is provided with a zirconium carbide coating.

* * * * *